Dec. 28, 1948.　　　J. W. RUTLEDGE　　　2,457,181
DEVICE FOR HOISTING BALES
Filed Jan. 14, 1946
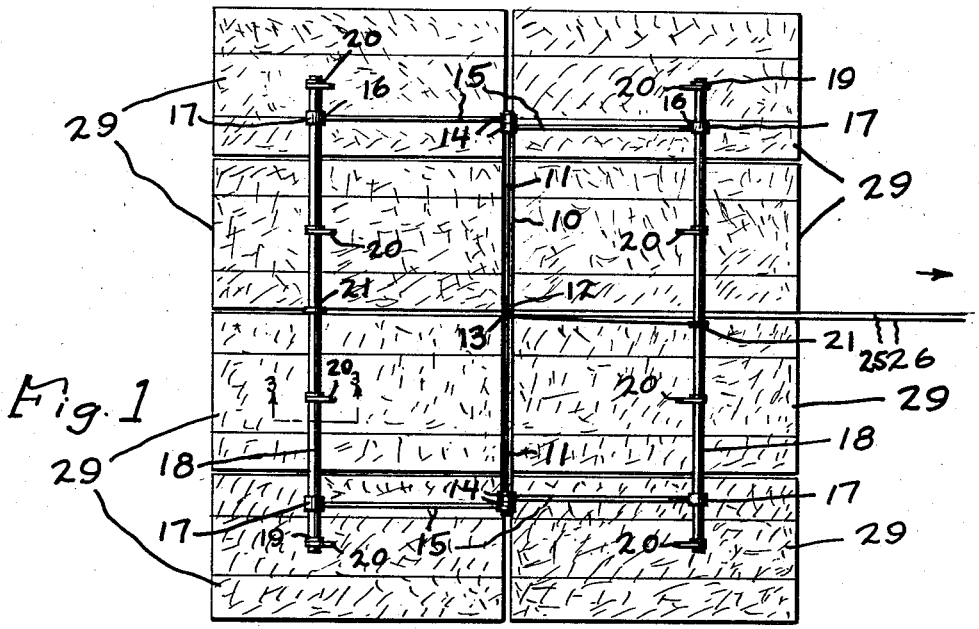
Fig. 1
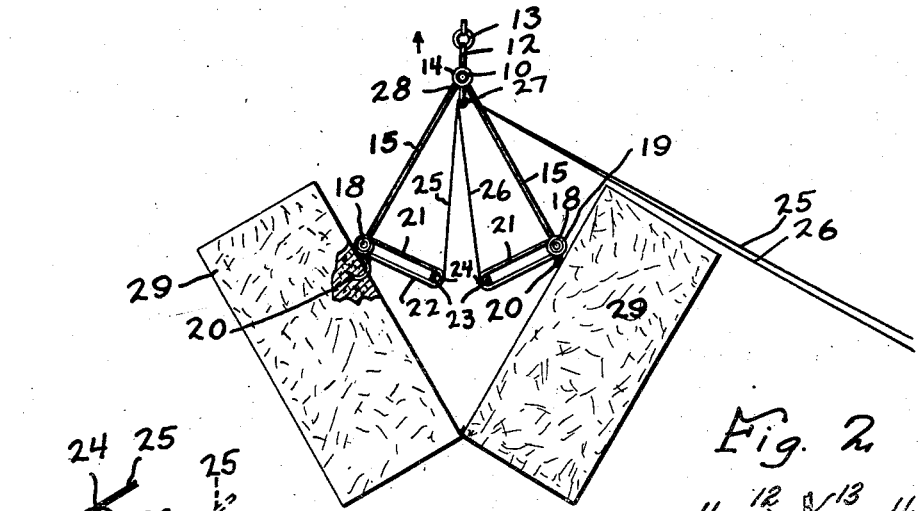
Fig. 2
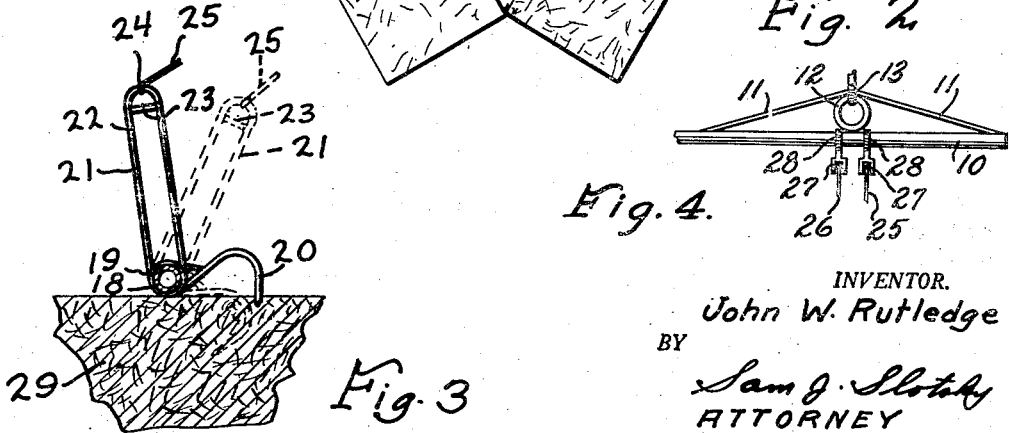
Fig. 3
Fig. 4
INVENTOR.
John W. Rutledge
BY
Sam J. Slotky
ATTORNEY Patented Dec. 28, 1948

2,457,181

UNITED STATES PATENT OFFICE 2,457,181

DEVICE FOR HOISTING BALES

John W. Rutledge, Early, Iowa

Application January 14, 1946, Serial No. 641,060

2 Claims. (Cl. 294—107)

My invention relates to a bale hoisting device.

An object of my invention is to provide a hoisting device wherein several bales of hay or other bales can be lifted and transferred to a different location at a different elevation, and all in one operation.

A further object of my invention is to provide an arrangement whereby the bales are easily attached, and whereby they are also easily disengaged after they have been moved to the desired location.

A further object of my invention is to provide an arrangement of the above character, wherein several bales can be engaged simultaneously, and in their normal flat position.

A further object of my invention is to provide a compact arrangement which is easily manipulated and can be manufactured at a reasonable cost.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a plan view of the device as it is being attached to the bales,

Figure 2 is a side elevation of Figure 1, and showing the bales in their lifted or elevated position, and Figure 3 is a detail of the engaging hook and bar and taken substantially along the section lines 3—3 of Figure 1.

Figure 4 is a detail showing a side elevational view of an upper portion of the device.

My invention contemplates the provision of a simple framework whereby a plurality of bales of hay or other bales can be engaged with the framework when in their normal flat position, and wherein the framework is then transported to its depositing location and thence the bales released by means of a simple mechanism.

I have used the character 10 to designate a centrally arranged pipe to which is attached the bracing rods 11 which are attached to the centrally arranged ring 12 which is attached at 13 to any suitable elevating mechanism such as block and tackle arrangements, etc. Journalled on the pipe 10 are the bushings 14 which are attached to the outwardly extending rods 15 which are attached at 16 to the further bushings 17 which bushings 17 receive the outer further pipes 18. Rigidly attached to the pipes 18 and at spaced equal intervals are the curled rod members 19 which members 19 extend into the hooks 20. Rigidly attached substantially centrally of the outer pipes 18 are the extending arms 21 which can be made of rod material 22 as shown and including the bracing members 23 (see Figure 3). It will be noted from Figure 3 that the arms 21 are at a substantial angle from the hook 20 for reasons to be explained.

Attached at 24 to each of the arms 21 are a pair of cables 25 and 26, each of which passes over each of a pair of pulleys 27 which are supported at 28 from the pipe 10.

The device is operated in the following manner. The arrangement is brought down directly over the bales of hay which are indicated by the character 29, and which are located either in a wagon or any other suitable similar device, and which are in their natural flat position as shown in Figure 1. The arrangement is then brought downwardly so that the central pipe 10 will rest upon the bales, and with the pipes 18 then being located at their furtherest outer position with respect to the central pipe 10. The arms 21 and hooks 20 will then be brought into the position as shown in Figure 3 and the arms 21 will be carried over to the dotted lines, carrying the hooks 20 directly into the bales 29, or the hooks can be pushed in directly, the forcing of one hook usually forcing in all of the hooks attached to its common pipe. The cables 25 and 26 are slackened, and next the entire arrangement is lifted by means of the usual block and tackle, etc., which is attached at 13. As the arrangement is lifted, the bales 29 which are now firmly engaged with the hooks 20 will rise and will occupy the position substantially as shown in Figure 2, and will abut together as shown, with the pipes 18 swinging toward each other.

The entire arrangement is then lifted upwardly in the direction of the arrow shown in Figure 2, thereby carrying the eight bales shown upwardly to the desired height, and the arrangement is then pulled in through the hay loft door until it is over the depositing location, and next the cables 25 and 26 are pulled, which correspondingly swings the arms 21 about the pipes 18 and also at the same time reversing the action shown in Figure 3, and pulling the hooks 20 out of the bales 29. The bales will then drop to the desired location, and the arrangement is then brought outwardly and down for succeeding loads.

The hay loft structure is not shown herein, since it is not essential to the invention, although it should be realized that the arrangement is principally adapted for use in such environments, the hay loft door being of sufficient width to carry the bales therethrough in the direction of the arrow shown in Figure 1.

It will now be seen that my invention provides the various advantages mentioned in the objects of my invention with further advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A device for hoisting bales comprising a central bar, a pair of further bars spaced from said central bar, means for pivoting said further bars from said central bar, means for engaging bales attached to said further bars, including hooks attached to the bars, means for rotating said bars to an engaging or disengaging position, including arms attached to said further bars, cables attached to said arms, said arms being rigidly attached to said further bars, said hooks being rigidly attached to said further bars, foldable arms attached between said central bar and said further bars, said arms including journals at either end thereof whereby all of said bars are rotatably mounted.

2. A device for hoisting bales comprising a central bar, a pair of further bars spaced from said central bar, means for pivoting said further bars from said central bar, means for engaging bales attached to said further bars, including hooks attached to the bars, means for rotating said bars to an engaging or disengaging position, including arms attached to said further bars, cables attached to said arms, said arms being rigidly attached to said further bars, said hooks being rigidly attached to said further bars, foldable arms attached between said central bar and said further bars, said arms including journals at either end thereof whereby all of said bars are rotatably mounted, pulleys attached to said central bar over which said cables pass to provide further means for swinging said arms when releasing said bales.

JOHN W. RUTLEDGE.

REFERENCES CITED

The following references are of record in the file of this patent:

UNITED STATES PATENTS

| Number | Name | Date |
|---|---|---|
| 155,233 | Gardner | Sept. 22, 1874 |
| 802,897 | Wettlaufer | Oct. 24, 1905 |
| 2,362,268 | Hall | Nov. 7, 1944 |